July 28, 1936.    J. B. BAKER    2,049,040
ROLLER BEARING CAGE
Filed July 24, 1935
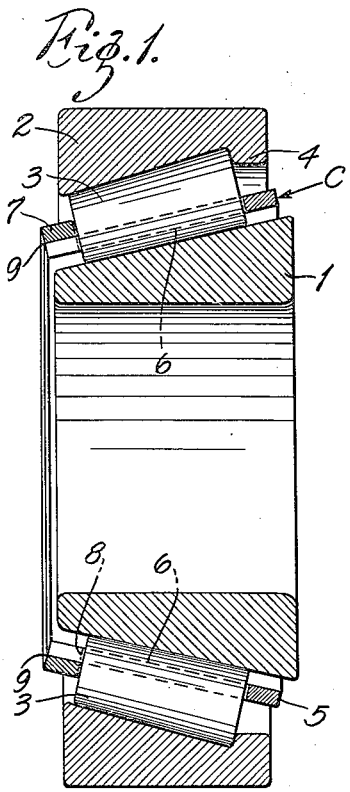
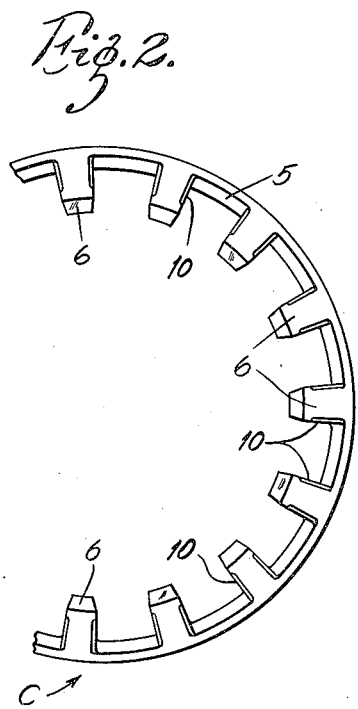
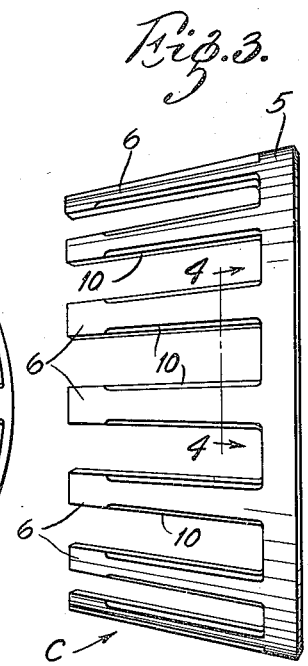
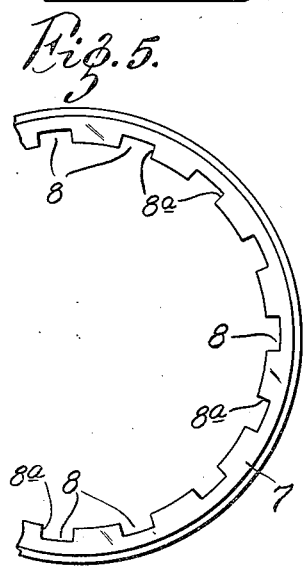
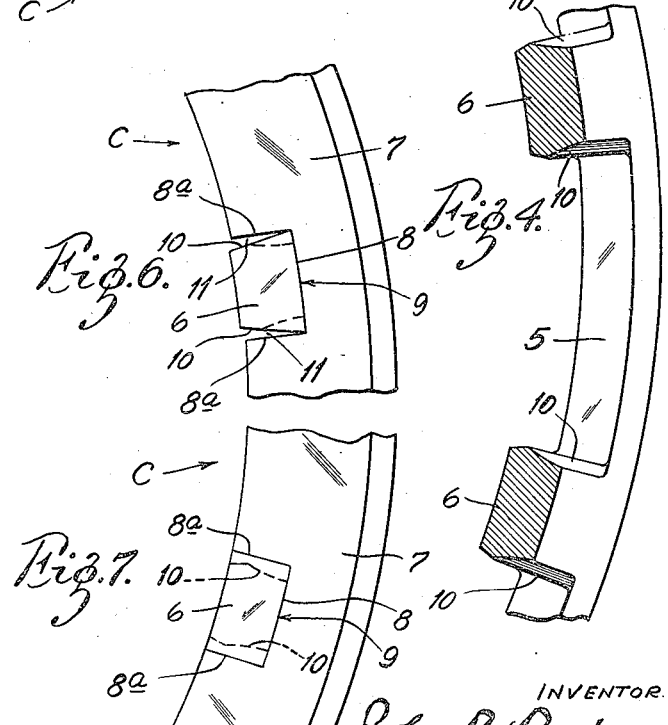
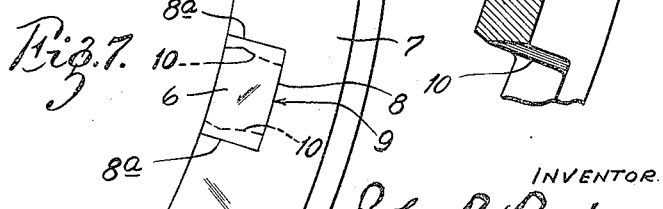
INVENTOR.
John B. Baker
by his ATTORNEYS.

Patented July 28, 1936

2,049,040

UNITED STATES PATENT OFFICE 2,049,040

ROLLER BEARING CAGE

John B. Baker, Canton, Ohio, assignor to The Timken Roller Bearing Company, Canton, Ohio, a corporation of Ohio Application July 24, 1935, Serial No. 32,856

1 Claim. (Cl. 308—218)

My invention relates to cages for taper roller bearings, particularly to cages for bearings of the ribbed cup type. The invention has for its principal object a cage which facilitates assembly of the rollers and cage in the bearing cup and which is strong enough for severe service. The invention consists principally in a cage for taper roller bearings having a large end ring with roller spacing bridges projecting integrally therefrom to form a conical cage body and a small end ring having notches around its inner periphery to receive the ends of said bridges, said bridges and said small end ring being secured together by welding. The invention further consists in the roller bearing cage and in the parts and combinations of parts hereinafter described and claimed.

In the accompanying drawing,

Fig. 1 is a longitudinal sectional view of a taper roller bearing provided with a cage embodying my invention, Fig. 2 is a fragmentary end view of the large bridge carrying end ring of the cage, Fig. 3 is a side elevation of said large end ring, Fig. 4 is a fragmentary cross section through adjacent bridges of the large end ring on the line 4—4 in Fig. 3, Fig. 5 is a fragmentary end view of the small end ring of the cage, Fig. 6 is a fragmentary end view of the small end ring showing the ends of the bridges therein prior to the final assembling operation; and Fig. 7 is a view similar to Fig. 6 showing such small end ring and the ends of the bridges in final assembled condition.

In the drawing is illustrated a taper roller bearing of the ribbed cup type, including a cone 1 or inner bearing member, a cup 2 or outer bearing member and a series of taper rollers 3 between said bearing members, the thrust rib 4 against which the large ends of said rollers abut being provided on the interior of the bearing cup 2. The cage C of such a bearing is disposed inwardly of the conical locus of the roller axes and the assembled rollers 3, cage C and cup 2 form a self-contained unit. The problem of assembling the rollers and cage in a bearing of this type is a serious one, the resilient cage commonly used often being permanently distorted as a result of the compression necessary to permit the rollers to clear the rib in said cup.

The cage of the present invention includes a large end ring 5 and conically disposed roller spacing bridges 6 projecting integrally therefrom, together with a small end ring 7 that is provided with notches 8 around its inner periphery, each of which receives the end of one of said bridges. Said bridges and said small end ring are secured together by spot or flash welding as indicated at 9. The sides 10 of the bridges may be given a concave curvature to conform to the sides of the rollers 3, as is common practice.

As appears from Fig. 6, the side walls 8a of the notches 8 are parallel, whereas the sides 10 of the bridges 6 are beveled or inclined, so that a space 11 of roughly V-shape is left between the side of each bridge and the adjacent portion of the ring. Accordingly it is desirable to make the cage stock slightly thicker than the depth of the notches in the end ring, so that, as appears in Fig. 6, the bridges will project inwardly from said notches. By any suitable pressing or metal flowing operation, the bridges may be made to fill up said notches, as appears in Fig. 7, after which the bridges and end ring may be secured together by an electric spot welding or flash welding operation. Such operation is facilitated by the approximately identical thickness of the cage stock and the overlapping end ring.

The above described construction is of light and simple construction, and yet it is quite rigid in use. The notched end ring construction and the taper of the cage body greatly relieves the strain on the weld, so that light welding is sufficient. The rollers, cup and cage parts are easily assembled and the securing operations are simple.

What I claim is:

A taper roller bearing comprising an outer bearing cup having a conical raceway portion and an integral annular thrust rib at the large end of said raceway, an inner bearing member whose outer periphery is conical from end to end, taper rollers between said bearing members and a cage for said rollers disposed inwardly of the locus of the axes thereof, said cage comprising a large end ring and conically disposed bridges integral therewith and a separate small end ring having notches around its inner periphery in which rest the ends of said bridges, said small end ring and said ends of said bridges being electrically welded together.

JOHN B. BAKER.